United States Patent [19]

Schreyer

[11] 4,330,990
[45] May 25, 1982

[54] CHAIN CLAW HOOK

[75] Inventor: Kenneth D. Schreyer, Clarence, N.Y.

[73] Assignee: Columbus McKinnon Corporation, Amherst, N.Y.

[21] Appl. No.: 153,042

[22] Filed: May 27, 1980

[51] Int. Cl.³ ............................................. F16G 15/04
[52] U.S. Cl. ........................................................ 59/93
[58] Field of Search ................. 59/93; 294/78 R, 82 R

[56] References Cited
U.S. PATENT DOCUMENTS 3,333,412  8/1967  Rieger ...................................... 59/93
4,273,371  6/1981  Behnke et al. ....................... 59/93 X

FOREIGN PATENT DOCUMENTS 2433345  1/1976  Fed. Rep. of Germany .......... 59/93

Primary Examiner—Mark Rosenbaum
Assistant Examiner—Timothy V. Eley
Attorney, Agent, or Firm—Bean, Kauffman & Bean

[57] ABSTRACT

An improved means is disclosed for detachably retaining the link of a chain to be temporarily engaged by a chain-grappling "claw" type hook. The retaining means comprises a resilient member at least partially overreaching the "pocket" portion of the hook into which the link of the engaged chain is temporarily captured; and is so constructed and arranged as to release the engaged chain link only when intended by the user, and with improved facility and ease of operation by the user.

10 Claims, 10 Drawing Figures

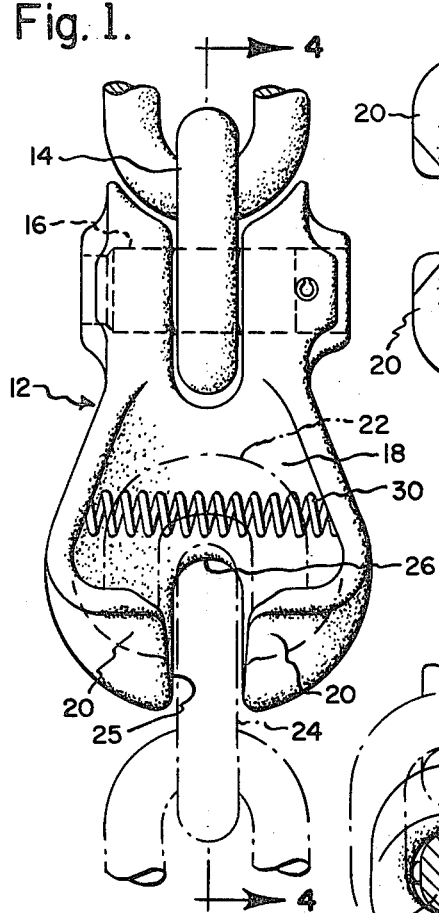
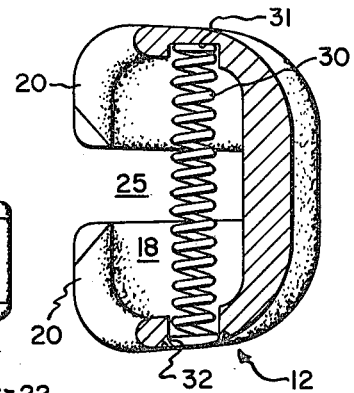
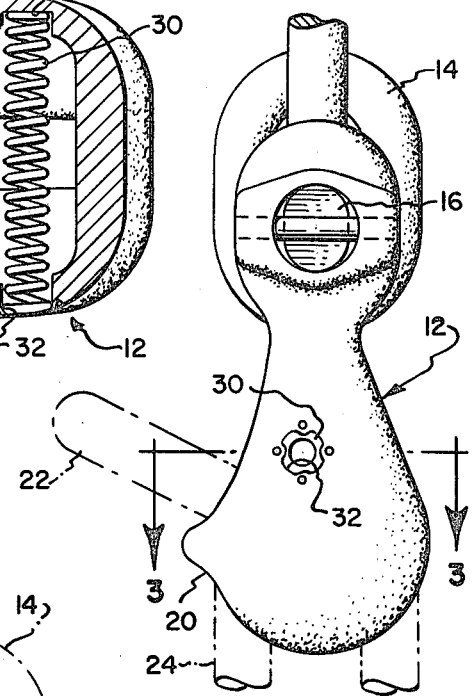
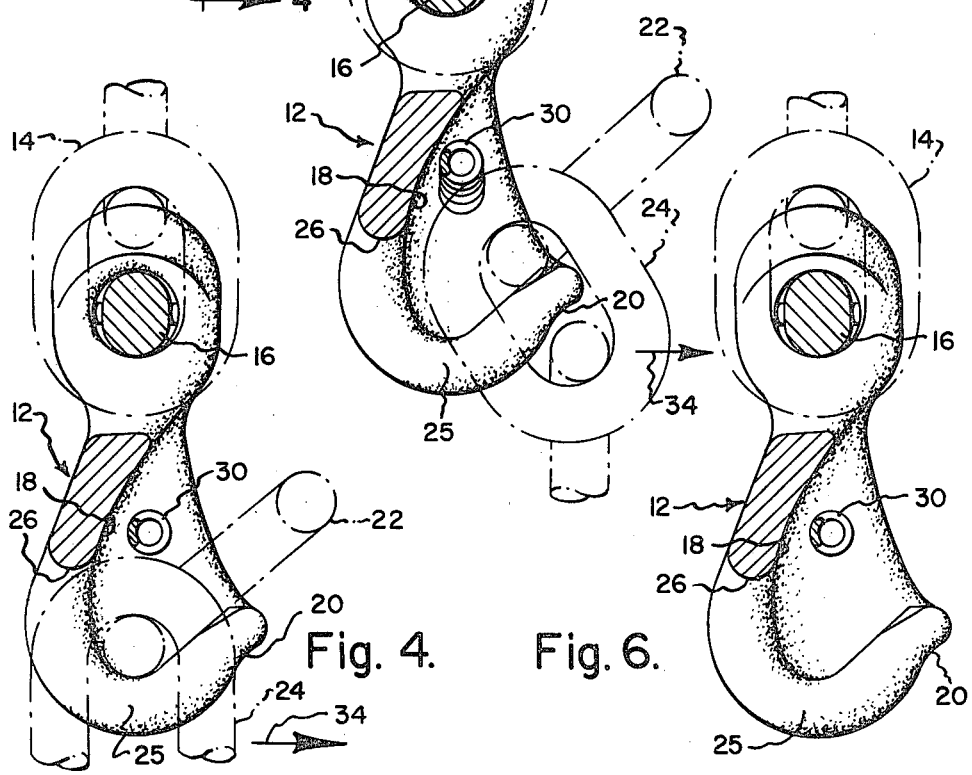

CHAIN CLAW HOOK

BACKGROUND AND OBJECT OF THE INVENTION

This invention relates to chain-grappling claw type hooks. In one type, the hook is coupled at one of its ends with the terminal link of a carrying strand of chain (or cable, or the like) and at the other end is formed with a claw-like configuration embracing a pocket for receiving therein a link of another chain. Such hooks may also be used, however, to grapple another link of the same carrying chain strand, for so-called chain shortening purposes. Or, the hook may be of the "double claw" type, as also may be employed to couple two separate strands of chain, or to shorten a single strand of chain. Devices of this type known to applicant are disclosed in U.S. Pat. Nos. 3,333,412; 3,601,978; 4,151,708; and German Pat. No. 2,433,345. The present invention relates to improved "safety latch" devices for such hooks, which operate to prevent inadvertent releases therefrom of the grappled link while also facilitating in improved manner intended disengagements thereof by the user.

THE DRAWINGS

In the drawings herewith:

FIG. 1 is a front elevational view of a claw hook embodying one form of safety latch device of the present invention; showing the claw hook to be suspended by means of a clevis type arrangement from a strand of chain, and engaging in its claw another chain link;

FIG. 2 is a side elevational view of the arrangement of FIG. 1;

FIG. 3 is a sectional view taken as along line 3—3 of FIG. 2;

FIG. 4 is a vertical sectional view taken as along line 4—4 of FIG. 1; and shows how the latch device thereof normally maintains the engaged chain link against inadvertent release;

Figure 7:
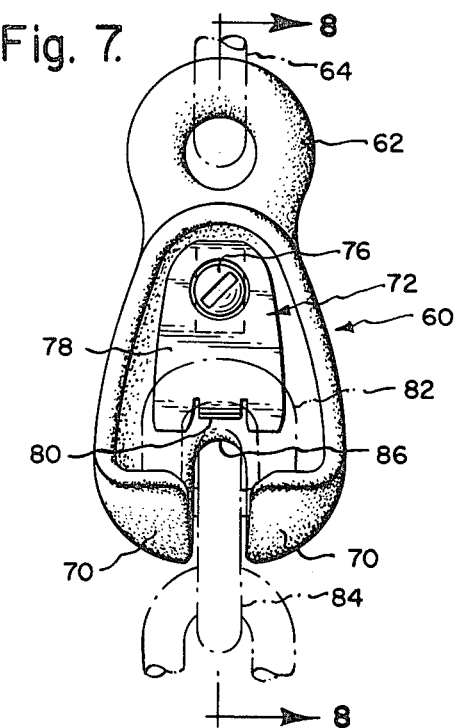
Figure 8:
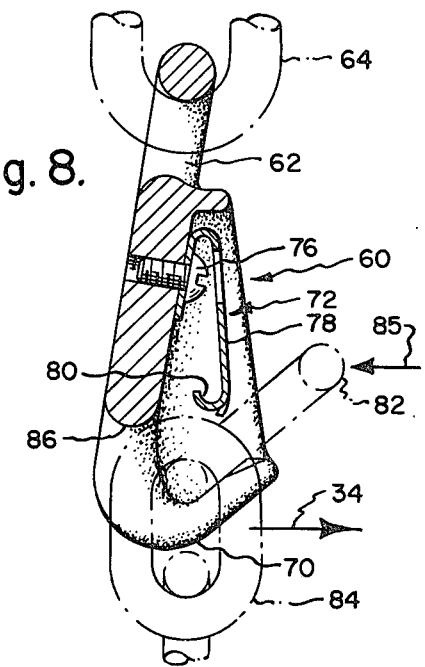
Figure 9:
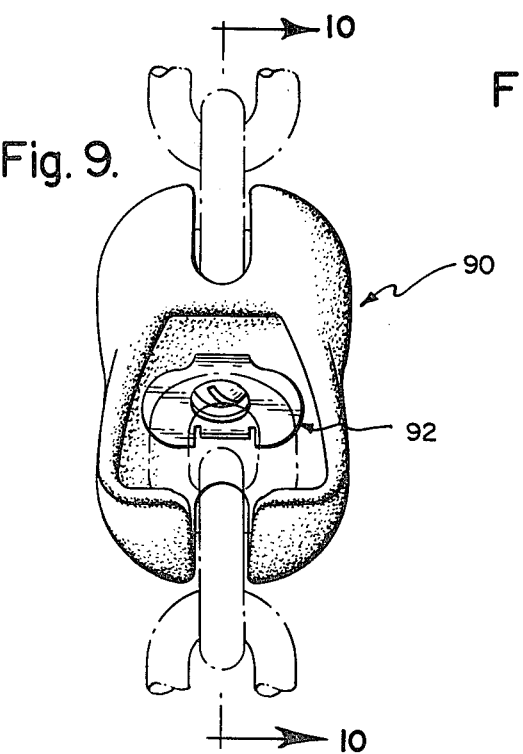
Figure 10:
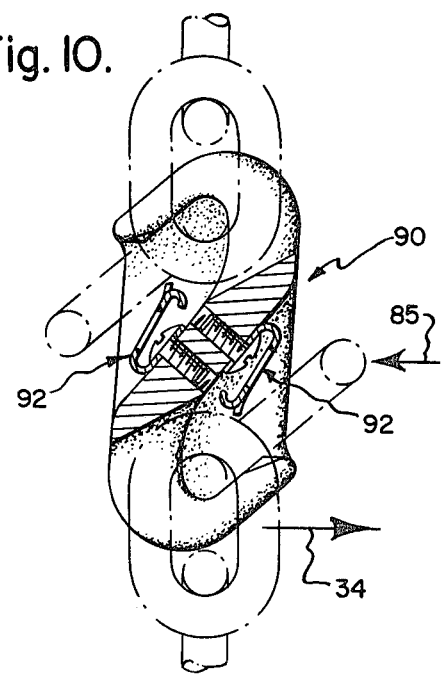

FIG. 5 corresponds to FIG. 4 but illustrates how the engaged chain may easily be intentionally released;

FIG. 6 corresponds to FIGS. 4, 5 but shows how the safety latch device restores to normal condition after removal of the engaged chain;

FIG. 7 corresponds to FIG. 1 but illustrates in a claw hook of a modified form provision of a modified form of safety latch device of the invention;

FIG. 8 corresponds to FIG. 4 but relates to the device of FIG. 7;

FIG. 9 illustrates employment of the type of safety latch shown in FIGS. 7, 8 when embodied in a so-called "double claw" hook; and FIG. 10 is a sectional view taken as along line 10—10 of FIG. 9.

As shown by way of example in FIGS. 1-6 herewith, the invention may be embodied in a claw hook of generally conventional design which is designated generally at 12. In this case, the hook is clevis-shaped at its upper end to receive the terminal link 14 of a suspension chain which is locked into the hook such as by means of a clevis pin 16. At its lower end, the hook is claw-formed with a chain link receiving pocket portion 18 which is centrally slotted as shown at 25. Thus, there is provided a claw-like configuration which is margined by a pair of forwardly extending and opposing wall portions 20—20. As illustrated herein, the pocket portion is adapted to receive in cradled relation therein the terminal link 22 of another strand of chain or alternatively, another link of the same chain strand. In either case, the next adjacent link 24 is thereby carried within the vertically open space 25 between the opposing walls 20—20 of the pocket. It is a particular feature of the claw hook configuration that the slot 25 is capped by a bridge abutment portion 26 of the main body of the hook, as best shown at FIGS. 4, 5.

As illustrated in FIGS. 1-6, the improved user-releasable "safety latch" means (or chain retention means) of this form of the present invention is illustrated at 30 to comprise a coil spring which is compression-mounted at its opposite ends in recesses 31-32 formed in the opposite walls 20—20 of the hook body. However, it is to be understood that the spring may be otherwise of any suitable configuration and mounted by any suitable means. In any case, the chain link controlling portion of the spring is so disposed as to extend across and above the crown of the chain link 24 when engaged in vertically hanging relation in the pocket, and slightly ahead of the vertical center line of the link (as best shown in FIG. 4). Also, as best shown in FIG. 4, the hook parts are so shaped that when the link 24 so resides in the pocket of the hook it is disposed part-way rearwardly under the bridge 26 such that the bridge is located adjacent the crown region of link 24 and behind the vertical center line thereof for non-yielding abutment therewith in response to upward movement thereof. Thus, it will be appreciated that the spring 30 and the bridge 26 effectively cooperate and function to resist straight line upward movements of the chain link 24 relative to the hook, such as would be required to permit unwanted disengagements from the hook such as are typically encountered in service.

However, as shown in FIG. 5, whenever it is desired by the user to disengage the engaged chain from the hook, the suspended portion of the chain below the hook may be employed by the operator in the manner of a lever by simply pulling outwardly of the hook thereupon as suggested by the arrow 34 in FIGS. 4, 5. The link 24 is thereby pried upwardly against the central portion of the spring 30 as shown in FIG. 5 to such a degree as to readily permit the chain link 24 to be pulled out of the hook pocket. During this process the link 22 slides outwardly on top of the walls 20—20 of the hook; and it is this cooperative action between the top surfaces of the walls 20—20; the bridge surface 26; and the spring 30 which enables the user to readily disconnect the previously engaged chain strand with improved ease and facility.

FIGS. 7, 8 illustrate another form of safety latch device of the invention as being embodied in a claw hook 60 which in this case is formed with a conventional type suspending eye 62 configuration for engagement with the terminal link 64 of the suspension chain. Thus, it is to be understood that the safety latch of the invention may be used in connection with any type suspension arrangement. As shown at FIGS. 7, 8 the hook body 60 is formed with a pocket 68 and forwardly extending hook walls 70—70 which correspond respectively to the pocket 18 and to the hook walls 20—20 of the construction shown in FIG. 1.

However, as is also shown in this case, the "safety latch" or chain retention means of the invention may include a resilient barrier device in the form of a leaf spring such as is designated generally at 72; said spring being firmly fixed at its back leaf portion 74 by means of a screw 76 of the like to the main body of the hook 60.

The front leaf 78 of the spring is configured and so disposed as to extend downwardly to terminate in a rolled end portion 80 which in front view extends laterally across, slightly above, and somewhat ahead of the side view vertical center line of the suspended chain link 84. As illustrated, the chain link 84 corresponds to the link 24 of FIGS. 1-6 and the chain link 82 corresponds to the link 22 of FIGS. 1-6.

Thus, it will be appreciated that, as in the case of the modification illustrated in FIGS. 1-6, the chain link 84 is normally blocked against disengagement from the hook by the overlying bridge portion 86 and the spring portion 80. However, whenever it is intended to disengage the suspended chain from the hook it may be simply manually pulled upon outwardly by pressure applied by the palm of the hand of the user in the direction indicated by the arrow 34 (FIG. 8), while at the same time the thumb of the same hand is conveniently applied to press against the upper end of the chain link 82 in the direction indicated by the arrow 85. It will be apparent that the chain link 82 is thus caused to operate as a lever to press the spring leaf 78 rearwardly; thereby releasing the link 84 for withdrawal from under the hook bridge portion 86 in response to the biasing pull by the user against the suspended chain strand, as in the manner of operation of the device of FIGS. 1-6.

FIGS. 9-10 illustrate embodiment of leaf spring type latch devices such as are shown in FIGS. 7-8 in connection with so-called "double claw" hooks. Such hooks are conventionally used in industry to either interconnect two separate strands of chains, or to "shorten" a single strand of chain. In this case, the "double claw" hook is designated generally at 90 and comprises in a single end-to-end combination a pair of claw pocket arrangements such as are individually illustrated and described hereinabove. Also, in this case, the "double claw" hook 90 is shown as being equipped at each of its ends with a leaf spring type safety latch arrangement 72 of the type illustrated in FIGS. 7-8. However, it is to be understood that in lieu of the leaf spring latch arrangement, the coil spring type latch device as is illustrated at FIGS. 1-6 and described hereinabove, may also be suitably employed in a "double claw" hook of this type.

Therefore, it will be apparent that the invention provides for improved security against unintended disengagements of the suspended (or interconnected) chain link, while also providing an improved and more readily facile arrangement for intended manual disengagements thereof.

What is claimed is:

1. In a chain link coupling device of the type including a body member having at its opposite ends means for engaging separate chain links; and in which said body member is provided at least at one of its ends with a claw type chain link engaging means; and wherein said engaging means comprises a pocket portion having spaced apart claws formed integral with and extending forwardly from said body member separated by an open slot therebetween; said pocket portion being adapted to engage therein a chain link when disposed transversely of said slot, while also accommodating in freely suspended relation within said slot the next adjacent link to said engaged chain link;

an improved user-releasable latch means preventing unintended separations of the engaged chain link from said pocket portion while also facilitating intended manually performed separations thereof; said improved latch means comprising in combination with said body member;

a bridge abutment portion formed integrally with said body member and joining said claws and capping said slot, said abutment portion disposed overhead the next adjacent link of a chain whenever an engaged link is residing in said pocket portion and located adjacent a crown region of said next adjacent link behind a vertical center line thereof for nonyielding abutment therewith in response to upward movement thereof; and a resilient barrier device anchored to said body member within said pocket portion thereof and extending transversely of said pocket portion and located above the crown region of and slightly ahead of the vertical center line of said next adjacent link when said next adjacent link is disposed in said slot.

2. A coupling device as set forth in claim 1 wherein said barrier device comprises a coil spring anchored at its opposite ends to said body member and has a central portion thereof disposed to extend transversely over said slot.

3. A coupling device as set forth in claim 1 wherein said barrier device comprises a coil spring extending transversely of said pocket portion and is anchored at its opposite ends into opposite side walls of said pocket portion of said body member.

4. A coupling device as set forth in claim 1 wherein said barrier device comprises a leaf spring which is anchored at one end of said body member and extends in cantilever spring leaf fashion therefrom and terminates at its free end in a ledge portion for abutting against and releasably holding said next adjacent link against rising in said slot.

5. A coupling device as set forth in claim 4 wherein said ledge portion comprises a rolled end portion of said leaf spring.

6. In a chain link coupling device of the type including a body member having at its opposite ends means for engaging separate chain links and in which said body member is provided at its opposite ends with claw type chain link engaging means, and wherein each of said engaging means comprises a pocket portion having spaced apart claws formed integral with and extending outwardly from said body member and separated by an open slot therebetween; said pocket portions each being adapted to accommodate therein an engaged chain link when disposed therein transversely of said slot while accommodating in freely suspended relation within said slot a link next adjacent to said engaged chain link;

an improved user-releasable latch means preventing unintended separation of said chain links from their respective pocket portions while also facilitating intended manually performed separations thereof; said improved latch means comprising in combination with said body member;

a bridge abutment portion formed integrally with said body member at each end thereof and joining said claws and capping said slot at each end of said body member, each of said abutment portions disposed in close spaced relation to the link next adjacent to the engaged chain link whenever said engaged chain link is residing in said pocket portion and located adjacent a crown region of said link next adjacent inwardly of a vertical center line thereof for nonyielding abutment therewith in response to movements thereof along the vertical center line towards said abutment portion; and resilient barrier devices anchored within the pocket portions at each end of said body member and each of said barrier devices having a central portion thereof extending transversely of said slot and located adjacent the crown region of and slightly outwardly of the vertical center line of said link next adjacent when said link next adjacent is disposed in said slot.

7. A coupling device as set forth in claim 6 wherein said barrier devices comprise coil springs anchored at their opposite ends to said body member and have central portions thereof disposed to extend transversely over said slots.

8. A coupling device as set forth in claim 6 wherein said barrier devices comprise coil springs extending transversely of said pocket portions of said body member and are anchored at their opposite ends into opposite side walls of said pocket portions of said body member.

9. A coupling device as set forth in claim 6 wherein said barrier devices each comprise a leaf type spring anchored at one end to said body member and extends in cantilever spring leaf fashion therefrom, and terminates at its free end in a chain abutment ledge portion.

10. A coupling device as set forth in claim 9 wherein each of said chain abutment ledge portions comprises a rolled end portion of each of said spring leaves.

* * * * *